United States Patent [19]

Marx et al.

[11] Patent Number: 4,868,022
[45] Date of Patent: Sep. 19, 1989

[54] RIBBON OF A CROSS-LINKED PLASTIC WHICH IS CAPABLE OF SHRINKING UPON THE ACTION OF HEAT

[75] Inventors: Karl-Heinz Marx, Garbsen; Hermann-Uwe Voigt, Stadthagen; Frank Patzke, Barsinghausen, all of Fed. Rep. of Germany

[73] Assignee: Kabelmetal electro Gesellschaft mit beschränkter Haftung, Hannover, Fed. Rep. of Germany

[21] Appl. No.: 86,109

[22] Filed: Aug. 14, 1987

[30] Foreign Application Priority Data

Aug. 16, 1986 [DE] Fed. Rep. of Germany ....... 3627911
Sep. 18, 1986 [DE] Fed. Rep. of Germany ....... 3631698

[51] Int. Cl.⁴ ............................ F16L 9/22; B32B 3/02
[52] U.S. Cl. .................................... 428/35.1; 138/155; 138/171; 156/86; 174/DIG. 8; 428/157; 428/192; 428/913
[58] Field of Search ................. 428/36, 157, 192, 913, 428/35.1; 156/86; 174/DIG. 8; 138/171, 155

[56] References Cited

U.S. PATENT DOCUMENTS

| | | | |
|---|---|---|---|
| 3,927,233 | 12/1975 | Naidoff | 428/58 |
| 3,959,052 | 5/1976 | Stanek | 428/157 |
| 4,310,367 | 1/1982 | Berejka | 428/57 |
| 4,366,201 | 12/1982 | Changani et al. | 428/157 |

Primary Examiner—Ellis P. Robinson
Assistant Examiner—James J. Seidleck
Attorney, Agent, or Firm—Martin A. Farber

[57] ABSTRACT

In a ribbon consisting of a cross-linked plastic which can be shrunk by the action of heat and can be placed in the manner of a collar (2a) around an elongated object (4), and after the connecting together of the edges (3a, 3b) of the ribbon, can be shrunk onto the object (4) by the action of heat. The edge regions (3a, 3b) of the ribbon consist of non-cross-linked plastic and a connecting together (5) of the ribbon edges (3a, 3b) is effected by fusion welding.

9 Claims, 3 Drawing Sheets

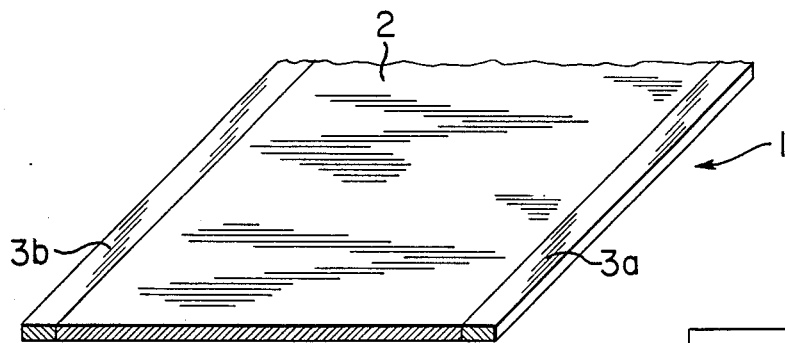
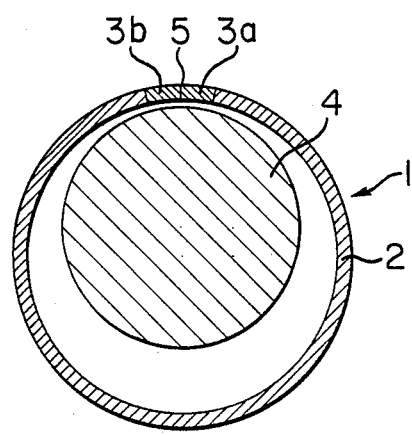
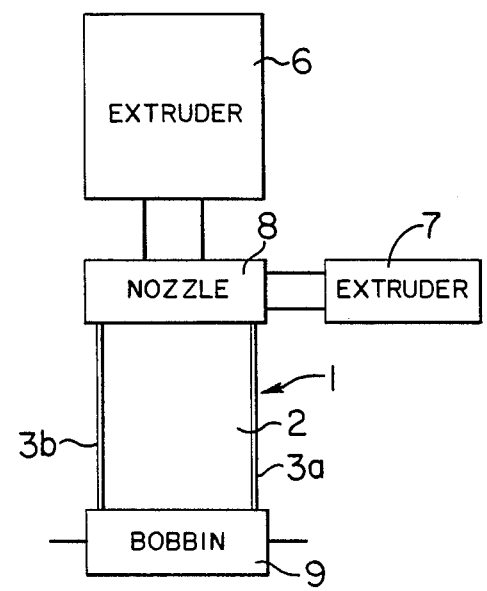
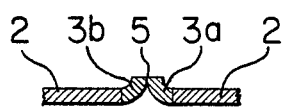
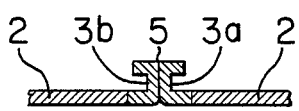
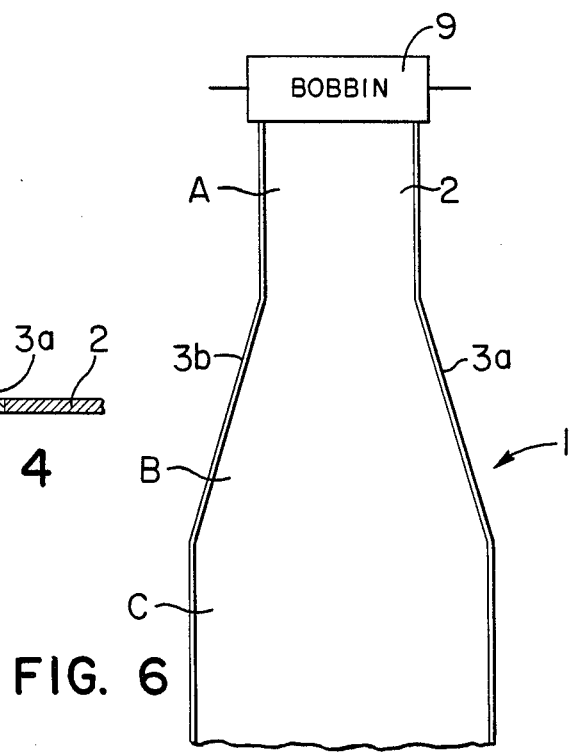

RIBBON OF A CROSS-LINKED PLASTIC WHICH IS CAPABLE OF SHRINKING UPON THE ACTION OF HEAT

BACKGROUND OF THE INVENTION

The present invention relates to a ribbon of a cross-linked plastic which is capable of shrinking under the action of heat and which is placed in the manner of a collar around an elongated object and can be shrunk on the object by the action of heat after the edges of the ribbon have been connected to each other.

For the subsequent insulation and covering of connecting sections of electric cables or lines, use has been made for a long time of shrink tubes which are pushed over the place of connection and then shrunk onto the place of connection. For the subsequent covering or insulating of connections of electric cables which have already been connected, collars of heat-shrinkable plastic have gained popularity. The collars are placed in the form of a ribbon around the cables at the place of connection, firmly connected mechanically together at their longitudinal edges and then shrunk upon the cables at the place of connection. The conecting of the longitudinal edges is effected, for instance, by clamping rails, and also by bonding the overlapping edges of the ribbon (Federal Republic of Germany As No. 15 25 815).

The longitudinal slit of such a coupling is frequently backed, for additional sealing, by a strap or tongue which can be bonded to the collar.

In order to produce a branching in such a coupling, the ribbon from which the collar is formed is held together by a clamp between the branch lines prior to the shrinking.

This known construction has the disadvantage that, as a result of the closure rails and the thickenings of the edges of the collar necessary for the engagement of the closure rail, a thickened longitudinal seam which is frequently disturbing results. Another disadvantage is that long lengths of cables or tubes or ducts cannot be surrounded in one continuous piece with such collars.

SUMMARY OF THE INVENTION

The object of the present invention, therefore, is to provide a ribbon which can be placed around cables, pipes or ducts and closed without additional closure elements such as closure rails, and which is furthermore adapted for the continuous sheathing of cables, pipes or ducts of greater length.

This object is achieved in the manner that the edge regions of the ribbon which are to be connected together consist of non-cross-linked plastic, and that the connecting of the edges of the ribbon is effected by fusion welding. By the invention, the firm attachment of the edges of the ribbon which is required prior to the shrinkage is effected by heat sealing forming a weld seam. In addition to the high mechanical strength of the weld seam, the advantage is also obtained that the weld seam is substantially more resistant to the penetration of moisture than a seal which is held together by closure rails or a bonded seam. Development of the edge regions of the ribbon from non-cross-linked plastic is necessary for the reason that cross-linked plastics cannot be welded together.

In order that sufficient material for the weld seam is available, it has proven advisable to develop the regions of the edge of the ribbon thicker than the thickness of the wall of the ribbon. These thickened edge regions furthermore also have the advantage that they can be used for the stretching process.

Practically any cross-linkable plastic can be used as material for the ribbon, However, it has proven advantageous to make the ribbon from a cross-linked polyethylene on which silane groups have been grafted, the regions of the edge of the ribbon consisting of non-cross linked polyethylene. A polyethylene which has been grafted with silane groups can be readily cross-linked without any great expense for apparatus. If it is necessary, for instance, that the region of the weld seam also be cross-linked, this can be achieved in the manner that the regions of the edge of the ribbon consist of a polyethylene which can be cross-linked by peroxide. The region of the weld seam is then cross-linked after the welding by additional heating, by which the cross-linking agent, for instance the peroxides in this case, are activated. At least one of the surfaces of the ribbon is coated, as known per se, with a sealing, anti-corrosion and/or adhesive agent. The ribbon is preferably extruded in one piece.

The invention furthermore concerns a method of manufacturing a ribbon such as described above, wherein a ribbon of cross-linkable plastic is extruded by means of an extruder and a shaping tool developed as flat sheeting die. Furthermore a strip of a plastic which is different from the plastic material of the ribbon is formed within the mold on each of the longitudinal edges of the ribbon. Also the plastic of the ribbon is cross-linked, in which connection the edge regions of the ribbon formed by the strip remain non-cross-linked. After cross-linking, the ribbon is heated to a temperature above the crystallite melting point, stretched transverse to the longitudinal direction of the ribbon, and finally cooled in stretched state. By means of the method of the invention it is possible to produce ribbons which are shrinkable transverse to their longitudinal direction in practically infinite length.

The cross-linking is effected advisedly in the presence of moisture, for which it is necessary that a polyethylene grafted with silane be used. The edge regions of the ribbon are extruded thicker than the wall thickness of the ribbon to serve as regions for the action of force upon the continuous stretching or as additional welding material. In this connection it is necessary that the edge regions are cooled by the stretching device so as to be able to apply the required stretching force to the ribbon. The method of manufacture of the ribbon is not limited to moisture-cross-linked plastics but can be used in the same way for plastics which are cross-linked by means of high-energy radiation. In this case the edge regions of the ribbon are covered during the cross-linking and thus not cross-linked.

The method is particularly advantageous for the manufacture of ribbons of large length and, if possible, only one ribbon width is produced so that not too many shaping tools must be kept in stock. However, for manufacture of more complicated shapes, for instance with connecting edges arranged at an angle to each other as, for instance, for tees or else curved connecting pieces or, and also, if the connecting seams are to be arranged transverse or at an angle to the direction of extrusion or the direction of shrinkage, the foregoing method is to be modified as follows.

The strip-shaped plastic material is formed by fusion welding on the edges of the ribbon which are to be connected together after the manufacture of the ribbon by extrusion or injection molding, but before the cross-linking. The plastic of the ribbon is cross-linked, and the edge regions of the ribbon which are formed by these strips remaining non-cross-linked. After the cross-linking the ribbon is heated to a temperature above the crystallite melting point, and is stretched transverse to the longitudinal direction of the welded strips and finally cooled in stretched condition. In this way, it is possible to produce, for instance, cross-shaped molded parts with weldable edges as are required, for instance, for the manufacture of a tee branch. By this procedure it is also possible to dispense with a relatively expensive coextrusion installation. The cross-linking is effected in this case advisedly also by the action of moisture or by high-energy radiation.

In the case of an extruded ribbon, the plastic strips can be welded on directly upon the emergence of the ribbon from the die. However, there is also the possibility of producing the plastic ribbon by traditional techniques and then applying the plastic strips later. This manner of procedure has proven advantageous in particular when relatively narrow ribbons are to be provided with weldable plastic strips. In this case, it has proven advisable first of all to extrude a ribbon of large width, then divide the ribbon lengthwise and weld the plastic strips to the longitudinal edges. Upon the manufacture of molded parts, one preferably proceeds in the manner that the molded parts are cut or stamped out of an extruded ribbon, and plastic strips are welded to the edges which are intended to be connected together. For certain purposes of use it may be advantageous to have the cut or stamped lines extend at an angle less than 90° and preferably less than 45°, to the longitudinal direction of the extruded ribbon or the direction of shrinkage. This manner of procedure is particularly advantageous when the ribbons are to be used for the wrapping of relatively simple elongated structures. The angular course of the cut or stamped lines and a stretching of the ribbon in the direction of extrusion provides that the weld seam is also at an angle to the direction of shrinkage. In this way, the weld seam can be relieved of stress and the weld-seam factor increased.

The invention furthermore concerns a method of manufacturing a covering for elongated material with the use of a ribbon in accordance with the foregoing concepts. The ribbon is in this connection placed around the article in the manner of a cuff, welded together along its edge regions and then shrunk. In this case, the welding takes place preferably by flush welding. In flush welding the regions of the edge of the ribbon which are to be welded together are brought to melting temperature by means of a heated took, for instance a tongue or a reflector, and pressed together until the molten zone has solidified. In order to obtain a collar or covering which is cross-linked throughout over the entire circumference, the edge regions are cross-linked during or after the welding. In this case it is advisable, as already mentioned, to extrude the edge regions from a plastic which can be wetted by peroxide.

The invention furthermore concerns a method for the continuous covering of continuous elongated material. In such case, the ribbon which is unwound from a storage bobbin is shaped continuously around the continuous elongated material so as to form an open-seam tube, then welded together along its longitudinal edges, and after the welding, caused to shrink. This method can be used to particular advantage for the covering of corrugated metal tubes, in which case the shrinking is carried out in such a manner that the ribbon material practically follows the undulated course of the metal tube. The advantage is thereby obtained for the wrapped metal tube that the actual flexibility of the metallic corrugated tube is not substantially restricted by the additional plastic covering. In covered corrugated tubes which have been produced by the traditional technique in which a smooth plastic jacket has been extruded onto the crests of the corrugated tubes, the flexibility is very greatly reduced.

In order to obtain a cleaner surface of the covering, it has proven advisable, after the welding, to remove the thickening applied in the region of the weld seam and then to shrink the covering onto the metal corrugated tube. Further objects of the invention are various collars, employing a ribbon according to the invention. In a branch collar, the collar consists of two ribbons which are butt-welded to each other along their longitudinal edges. The branches are formed by again welding a given length of the weld seams. In the case of a T-shaped branch collar, the collar is produced from a cross-shaped ribbon which is placed over the T-shaped branch and is welded together at the lines of contact. A double T-shaped branch collar is characterized by the fact that two identical cross-shaped ribbons are placed one above the other and welded together on the contact edges which extend in the longitudinal direction of the cable or of the line or of the pipe.

BRIEF DESCRIPTION OF THE DRAWINGS

The invention will be explained in further detail with reference to the embodiments shown diagrammatically in FIGS. 1 to 13, wherein:

FIG. 1 is a plan view of a plastic ribbon;

FIG. 2 is a sectional view of an article enclosed by the ribbon;

FIG. 3 is a sectional view of a weld seam according to a first embodiment;

FIG. 4 is a sectional view of a weld seam according to a second embodiment;

FIG. 5 is a plan view of an apparatus employed in manufacture of the ribbon;

FIG. 6 shows a stretching of the ribbon manufacture by the apparatus of FIG. 5;

DETAILED DESCRIPTION OF THE PREFERRED EMBODIMENTS

Figure 7:
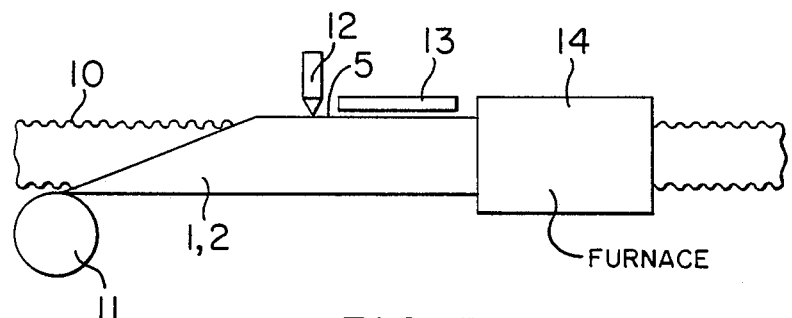
FIG. 7 shows a method for wrapping a corrugated tube.

FIG. 1 shows a ribbon of plastic whose central region 2 is cross-linked and whose edge regions 3a and 3b are not cross-linked. The region 2 may suitably consist of polyethylene on which silanes have been grafted and which cross-links in the presence of moisture. The edges 3a and 3b may be thickened relative to the wall thickness of the central region 2 and are also formed of polyethylene, to which peroxides have been added which, after or during the welding, permit a cross-linking of the edge regions 3a and 3b.

FIG. 2 is a section through an article 4 which is to be wrapped and which is surrounded by the ribbon 1. The edge regions 3a and 3b are welded together at 5. After the welding together of the edge regions 3a and 3b, the ribbon 1, which has been prestretched in the region 2, is shrunk onto the periphery of the article 4 in the form of a collar 2a.

FIGS. 3 ad 4 show different embodiments of the weld seam 5. In the embodiment shown in FIG. 3, the regions of the edges of the ribbon have been pulled up, as a result of which more material is made available to the weld seam 5. The surfaces of the edge regions 3a and 3b which face away from the weld seam 5 form regions of attack by use of pressing rollers (not shown) in a manufacturing process.

In the embodiment shown in FIG. 4, the edge regions 3a and 3b are developed in the form of webs on the ribbon region 2; in this case also the surfaces of the edge regions 3a and 3b which face away from the weld seam 5 for treatment by pressing rollers.

FIGS. 5 and 6 show the manufacture of a ribbon 1 diagrammatically in top view. By means of a co-extrusion installation which consists of an extruder 6 and an extruder 7 which together feed the plastic compositions to a common nozzle 8, i.e. to a flat sheeting die. The ribbon 1, comprising the central region 2 and the edge regions 3a and 3b, is extruded, cooled and wound on a bobbin 9. The ribbon 1 wound on the bobbin 9 is then cross-linked—in the case of moisture-cross-linkable polyethylene, the bobbin is introduced into a steam-filled oven and kept therein for several hours. The cross-linked ribbon 1 is then continuously withdrawn from the bobbin 9 and heated in a first stage A gradually up to a temperature above the crystallite melting point of the plastic; in a second stage B it is stretched continuously transverse to the longitudinal direction of the ribbon 1, and it is then cooled in stretched condition in a stage C. The cooled stretched ribbon 1 can then again be wound on bobbins (not shown) or else cut in the desired shape.

FIG. 7 shows diagrammatically a method by which a corrugated metal tube 10 can be continuously wrapped with a plastic ribbon of cross-linked material. Around the continuously fed corrugated metal tube 10—in this connection, however, a smooth pipe may also be considered—the ribbon 1 withdrawn from a storage bobbin 11 is shaped into an open-seam tube and then welded together in the region of the edges of the ribbon by means of a hot-tool welding device 12; the weld burr is removed in a manner not shown in the drawing. By means of an after-heating device 13, the weld seam 5 is heated to such an extent that the peroxides decompose and the plastic material of the weld seam 5 and of the adjoining regions is cross-linked. The tube which has been covered in this manner is then introduced into a continuous furnace 14 in which the plastic ribbon is brought to shrinkage temperature so that it places itself on the corrugated tube 10 following the corrugated shape thereof.

Figure 8:
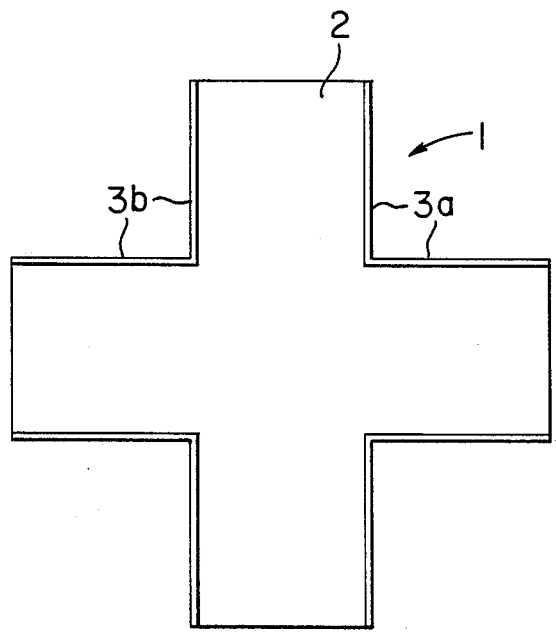
FIG. 8 shows a plan view of a ribbon produced in the shape of a cross by injection molding.
Figure 8A:
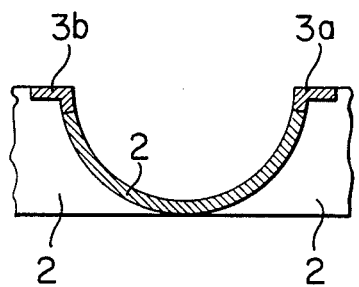
FIG. 8a shows a modification, in sectional view, of the ribbon of FIG. 8 stretched in a semicircular configuration.

FIG. 8 shows in top view a prestretched ribbon 1 which is produced in cross shape by injection molding. The edge regions 3a and 3b of non-cross-linked plastic are also formed upon the injection. The ribbon shown is biaxially stretched, i.e. in two axes perpendicular to each other which follow the course of the cross-shaped arms. Such a ribbon can be used for the production of a T-branch coupling in the manner that the ribbon is placed around the T-branch and welded at its ribbon edges 3a and 3b. After the welding it is shrunk in the manner described above. The stretching of the ribbon 7 can also be obtained in the manner that the central regions 2 of the arms forming the cross are stretched semicircularly in cross section (see FIG. 8a). For the production of a double-T branch two of the ribbons 1 shown in FIGS. 8 and 8a are placed around the double T-branch, welded together at the edges 3a and 3b and then shrunk.

Figure 9:
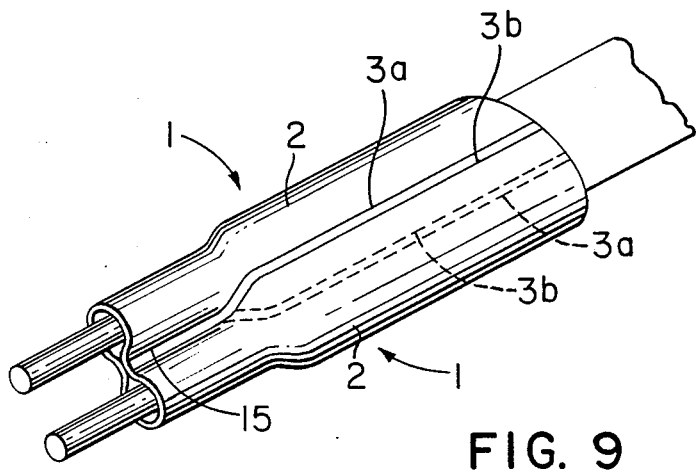
FIG. 9 shows a branch collar in perspective view.

FIG. 9 shows a branch collar such as used, for instance, in communication engineering for the branching of cables. A ribbon made of two individual ribbons 1 and produced by welding the longitudinal edges 3a and 3b together is placed around the non-visible branching place and welded together at its longitudinal edges 3a and 3b which are still not connected (on top in FIG. 9). In the region of the branch the weld seams, produced upon the connecting together of the ribbons or ribbon are welded to each other, as shown at 15 and the resulting branch collar is then shrunk. As in the case of all weld seams which are to be produced on the construction site, the weld seam 15 is also produced by hot-tool welding with an electrically-heated or gas-heated reflector.

Figure 10:
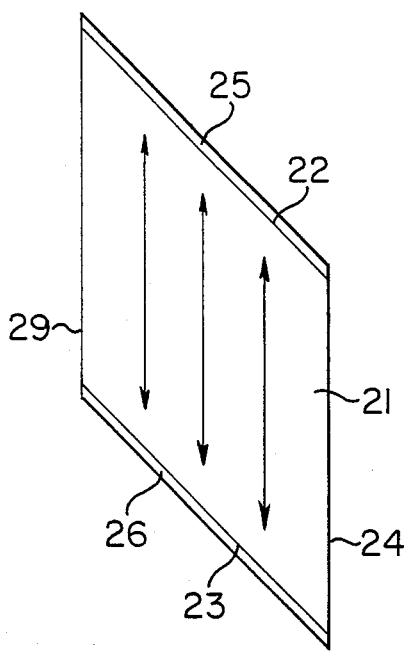
FIG. 10 shows a part of an extruded ribbon formed with non-perpendicular edges.

FIG. 10 shows a shaped part 21 which was cut or punched in the form of a parallelogram out of an extruded ribbon of cross-linkable plastic. The cut edges 22 and 23 may suitably extend at an angle of 45° to the direction of the edges 24 and 29. At the cut edges 22 and 23 plastic strips 25 and 26 are attached by welding, preferably by hot-tool welding. The shaped part produced in this manner is then cross-linked, the plastic strips 25 and 26 remaining non-cross-linked. After the cross-linking, the shaped part 21 is heated to a temperature above the crystallite melting point of the plastic and is stretched in the direction indicated by the arrows. The shaped part 21 is cooled in this stretched condition.

Figure 11:
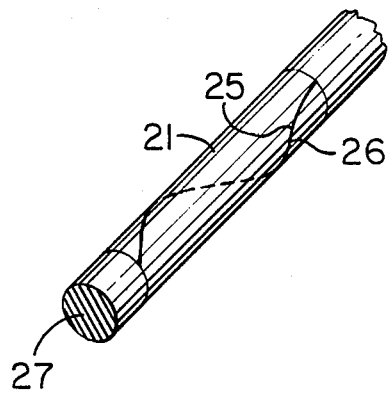
FIG. 11 is a perspective view of a shaped part of a ribbon wrapped around an elongated object.

The shaped part 21 can then, as shown in FIG. 11, be wrapped around an elongated object 27 in such a manner that the plastic strips 25 and 26 abut and extend helically around the center axis of the elongated object 27. The plastic strips 25 and 26 can then be welded to each other, for instance by hot-tool welding. By heating the plastic ribbon 21 the latter is shrunk down onto the contour of the elongated object 27. Due to the fact that the weld seam between the plastic strips 25 and 26 extends at an angle of 45° to the direction of the shrinkage forces the weld seam is relieved of any stress. For adaptation to the cross-linked material of the plastic ribbon 21, the edge strips 25 and 26 can also be cross-linked before or after the shrinkage. This can be achieved, for instance, by using as material for the plastic strip a polyethylene which is grafted with silane and which can be cross-linked in the presence of moisture. Alternatively, a radiation-cross-linkable material is used and a peroxide cross-linkable plastic material which can be cross-linked by increasing the temperature to a temperature above the decomposition temperature of the peroxides is used as material for the plastic strips 25 and 26; in which case it is preferable to use peroxides which react at low temperature or other radical initiators.

Figure 12:
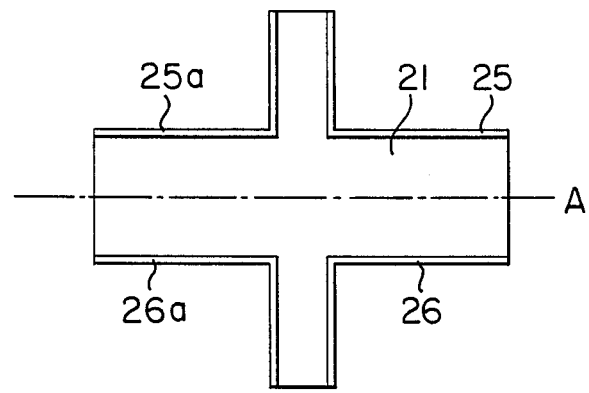
FIG. 12 is a plan view of another embodiment of a shaped part of a ribbon.

FIG. 12 shows another embodiment of a shaped part which is produced in accordance with the teaching of the invention. A cross-shaped part 21 a is stamped or cut out of an extruded ribbon, and plastic strips 25, 25a, 26 and 26 are welded to its edges in still non-cross-linked condition. By folding around the axis A such a shaped part can, for instance, be formed into a T-branch and the ribbon edge regions 25 and 26 as well as 25a and 26a welded to each other. Such T's are used, for instance, in tubeline construction and also in scaffolding for the over-shrinking of T branches.

Figure 13:
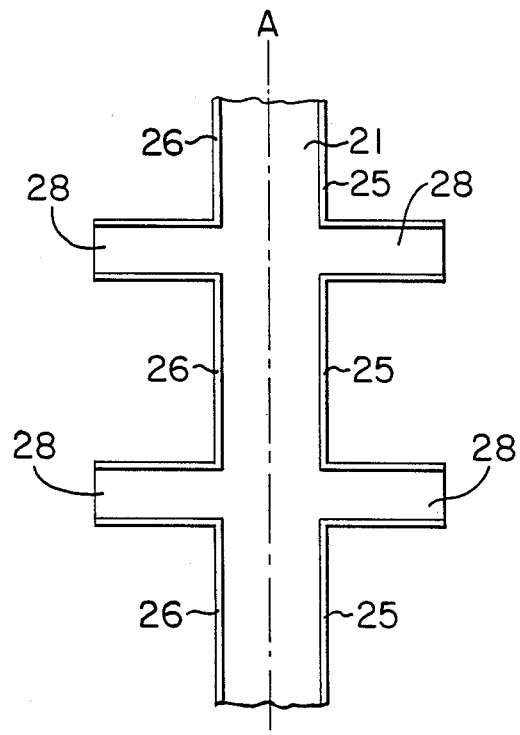
FIG. 13 is a plan view of yet another embodiment of a shaped part having two sets of arms.

FIG. 13 shows another embodiment of a shaped part 21b which has additional arms 28 and to the ribbon edges of which plastic strips 25 and 26 are welded. By folding the ribbon 2b around the axis A there can be obtained a structure which forms a succession of several T branches. Such shrinkage shaped parts can be used, for instance, for shrinkage around so-called cable harnesses, such as are customary in automobile electrical systems or in general electrical installation work.

We claim:

1. A ribbon which is shrinkable under the action of heat and placeable in the manner of a collar around an elongated object and, after a connecting together of edges of the ribbon, is shrinkable onto the object by the action of heat; the ribbon comprising
   a central region of plastic and edge regions of plastic, said central region being bounded by said edge regions, opposed ones of said edge regions being connectable to each other to permit formation of a collar; and wherein
   said central region comprises a cross-linked plastic which is shrinkable under the action of heat;
   edge regions of the ribbon which are to connected to each other comprise a non-cross-linked plastic; and
   the non-cross-linked plastic of the edge regions permit the formation of a fusion weld between edge regions for connecting the edge regions of the ribbon.

2. A ribbon according to claim 1, wherein the edge regions of the ribbon are thicker than the central region.

3. A ribbon according to claim 1, wherein a central region of the ribbon comprises cross-linked polyethylene on which silane groups have been grafted; and
   the edge regions of the ribbon comprise a non-cross-linked polyethylene.

4. A ribbon according to claim 3, wherein the polyethylene of the edge regions of the ribbon are cross-linkable by peroxide.

5. A ribbon according to claim 1, wherein at least one surface of the ribbon is coated with a coating comprising a sealing agent, an anti-corrosion agent and/or an adhesive.

6. A ribbon according to claim 1, wherein the ribbon is extruded as a single piece.

7. A branch collar for cables or conduit is comprising two ribbons, each said ribbon being shrinkable under the action of heat and placable in the manner of a collar around an elongated objct and, after a connecting together of edges of the two ribbons, the ribbons are shrinkable onto the object by the action of heat; each ribbon comprising
   a central region of plastic and edge regions of plastic, said central region being bounded by said edge regions, opposed ones of said edge regions being connectable to each other to permit formation of a collar; and wherein
   said central region comprises a cross-linked plastic which is shrinkable under the action of heat;
   edge regions of the two ribbons which are to be connected to each other comprise non-cross-linked plastic; and
   the non-cross-linked plastic of the edge regions permit the formation of a fusion weld between edge regions for connecting the edge regions of the ribbons; and wherein
   said two ribbons are butt-welded to each other at their longitudinal edges, there being branches of said collar separated by a weld between two weld seams along a given length of the weld seams.

8. A T-shaped branch collar for cables or ducts constructed of a ribbon which is shrinkable under the action of heat and placeable around an elongated object to form a collar and, after a connecting together of edges of the ribbon, are shrinkable onto the object by the action of heat, each ribbon comprising
   a central region of plastic and edge regions of plastic, said central region being bounded by said edge regions, opposed ones of said edge regions being connectable to each other to permit formation of a collar; and wherein
   said central region comprises a cross-linked plastic which is shrinkable under the action of heat;
   edge regions of the ribbon which are to be connected to each other comprise a non-cross-linked plastic; and
   the non-cross-linked plastic of the edge regions permit the formation of a fusion weld between edge regions for connecting the edge regions of the ribbon; and wherein
   said ribbon is a cross-shaped ribbon, said cross-shaped ribbon being placed over a T-shaped branch and being welded together at edge lines of contact.

9. A double T-shaped branch collar for cables or ducts comprising two cross-shaped ribbons, each said ribbon being shrinkable under the action of heat and placable in the manner of a collar around an elongated object and, after a connecting together of edges of the two ribbons, the ribbons are shrinkable onto the object by the action of heat; each ribbon comprising
   a central region of plastic and edge regions of plastic, said central region being bounded by said edge regions, opposed ones of said edge regions being connectable to each other to permit formation of a collar; and wherein
   said central region comprises a cross-linked plastic which is shrinkable under the acton of heat;
   edge regions of the two ribbons which are to be connected to each other comprise a non-cross-linked plastic; and
   the non-cross-linked plastic of the edge regions permit the formation of a fusion weld between edge regions for connecting the edge regions of the ribbon; and wherein
   said two cross-shaped ribbons are located one above the other and are welded together at contact edges extending in a longitudinal direction of the cable or duct.

* * * * *